United States Patent
Richards et al.

(10) Patent No.: US 9,394,858 B2
(45) Date of Patent: Jul. 19, 2016

(54) CHARGE AIR COOLING CONTROL FOR BOOSTED ENGINES TO ACTIVELY MAINTAIN TARGETED INTAKE MANIFOLD AIR TEMPERATURE

(71) Applicant: FORD GLOBAL TECHNOLOGIES, LLC, Dearborn, MI (US)

(72) Inventors: Adam J. Richards, Canton, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 13/794,192

(22) Filed: Mar. 11, 2013

(65) Prior Publication Data

US 2014/0251239 A1    Sep. 11, 2014

(51) Int. Cl.
*F01P 7/02* (2006.01)
*F02M 31/20* (2006.01)
*F02B 29/04* (2006.01)

(52) U.S. Cl.
CPC .......... *F02M 31/205* (2013.01); *F02B 29/0468* (2013.01); *F02B 29/0493* (2013.01); *Y02T 10/146* (2013.01)

(58) Field of Classification Search
CPC ........ B60K 11/08; F01P 2060/02; F01P 7/10; F01P 2003/182; F01P 3/18; F01P 3/20; F01P 11/10; F01P 7/164; F01P 11/16; F01P 7/167; F02B 29/0493
USPC ................. 123/41.05, 41.12, 41.31, 542, 563, 123/568.12; 180/68.1; 60/599
See application file for complete search history.

(56) References Cited

U.S. PATENT DOCUMENTS

| 4,779,577 | A | * | 10/1988 | Ritter | F01P 7/02 123/41.05 |
| 5,215,044 | A | * | 6/1993 | Banzhaf | F01P 1/00 123/41.05 |
| 5,542,399 | A | | 8/1996 | Altmann et al. | |
| 6,588,380 | B2 | * | 7/2003 | Ries-Mueller | F01P 7/12 123/41.05 |
| 6,695,047 | B2 | * | 2/2004 | Brocksopp | 165/292 |
| 6,772,714 | B2 | * | 8/2004 | Laird | F01P 7/042 123/41.12 |
| 6,848,397 | B2 | * | 2/2005 | Haase | 123/41.01 |
| 6,854,544 | B2 | * | 2/2005 | Vide | B60K 11/085 180/68.1 |
| 7,128,026 | B2 | * | 10/2006 | Braun et al. | 123/41.01 |
| 7,418,857 | B2 | * | 9/2008 | Tanaka | 73/114.34 |
| 7,644,793 | B2 | * | 1/2010 | Iwasaki | F01P 3/20 180/68.1 |

(Continued)

FOREIGN PATENT DOCUMENTS

EP          2375035 A1    10/2011

*Primary Examiner* — Marguerite McMahon
*Assistant Examiner* — James Kim
(74) *Attorney, Agent, or Firm* — Julia Voutyras; Alleman Hall McCoy Russell & Tuttle LLP

(57) ABSTRACT

Methods and systems are provided for adjusting a charge air cooler fan or charge air cooler coolant pump and an engine cooling fan and/or vehicle grille shutters based on a target manifold charge air temperature. In one example, the grille shutter position and/or engine cooling fan speed may be adjusted based on a difference between a target manifold charge air temperature and a temperature of the charge air cooler cooling medium. Further, the charge air cooler fan speed or charge air cooler coolant pump speed may be adjusted based on a difference between a charge air cooler inlet charge air temperature and the target manifold charge air temperature.

20 Claims, 8 Drawing Sheets

(56) References Cited

U.S. PATENT DOCUMENTS

| | | |
|---|---|---|
| 7,669,417 B2 | 3/2010 | Smith |
| 7,779,791 B2 | 8/2010 | Holzbaur et al. |
| 7,784,576 B2 * | 8/2010 | Guilfoyle et al. ............ 180/68.1 |
| 7,798,134 B2 * | 9/2010 | Marsh ..................... B61C 5/04 |
| | | 123/568.12 |
| 8,429,911 B2 * | 4/2013 | Back et al. ..................... 60/599 |
| 2004/0250800 A1 * | 12/2004 | Nechvatal ........... F02B 29/0462 |
| | | 123/563 |
| 2006/0086548 A1 * | 4/2006 | Muramatsu ............ B60K 11/08 |
| | | 180/68.1 |
| 2006/0095178 A1 * | 5/2006 | Guilfoyle ............ B60K 11/085 |
| | | 701/36 |
| 2006/0272608 A1 * | 12/2006 | Hara .................. F01L 13/0015 |
| | | 123/182.1 |
| 2010/0154629 A1 * | 6/2010 | Fujitani ............................ 95/15 |
| 2011/0114066 A1 * | 5/2011 | Vasallo .............. F02B 29/0406 |
| | | 123/564 |
| 2011/0225955 A1 * | 9/2011 | Kimura .................. F01N 3/101 |
| | | 60/278 |
| 2012/0067330 A1 * | 3/2012 | Wu .................... F02B 29/0412 |
| | | 123/540 |
| 2012/0181001 A1 * | 7/2012 | Marsh ..................... F01P 3/20 |
| | | 165/121 |
| 2012/0270490 A1 * | 10/2012 | Turner .................... F01P 7/12 |
| | | 454/75 |
| 2012/0288377 A1 * | 11/2012 | Hartman et al. ................ 417/13 |
| 2013/0036991 A1 * | 2/2013 | Kerns .................... F01P 7/10 |
| | | 123/41.04 |
| 2013/0282256 A1 * | 10/2013 | Watanuki et al. ............. 701/102 |
| 2013/0298554 A1 * | 11/2013 | Sellnau ........................... 60/609 |

* cited by examiner

CHARGE AIR COOLING CONTROL FOR BOOSTED ENGINES TO ACTIVELY MAINTAIN TARGETED INTAKE MANIFOLD AIR TEMPERATURE

BACKGROUND/SUMMARY

Turbo charged engines utilize a Charge Air Cooler (CAC) to cool compressed air from the turbocharger, before it enters the engine. CACs may either use cooled coolant passing through the CAC or ambient air passing across the CAC to cool charge air passing through the inside of the CAC. As such, a CAC coolant pump or CAC fan, coupled to the CAC, may control local CAC cooling. Grille shutters positioned at a vehicle front end and an engine cooling fan may control a flow of ambient air from outside the vehicle to the CAC, thereby controlling external CAC cooling. The manifold charge air temperature, or temperature of the air exiting the CAC, may be controlled by adjusting local and external CAC cooling. CACs may be used to maintain the charge air at a temperature low enough to increase combustion stability but high enough to reduced condensate formation within the CAC. However, in some cases, CACs may be slow to respond to temperature fluctuations and increase, rather than decrease, downstream charge air temperatures.

Other attempts to address maintaining a target charge air temperature include adjusting a CAC coolant pump (e.g., on/off), grille shutters, and/or engine cooling fan in response to a measured manifold charge air temperature (e.g., CAC outlet air temperature). For example, in response to a manifold charge air temperature increasing above a target value, a coolant pump may be turned on to decrease the temperature of the charge air exiting the CAC.

However, the inventors herein have recognized potential issues with such systems. As one example, adjusting the above cooling devices in response to a measured manifold charge air temperature alone may result in decreased precision in maintaining a target manifold charge air temperature. For example, if ambient air temperature increases or decreases, this type of control may not adjust the cooling devices until the manifold charge air temperature moves away from the target temperature. As such, condensate formation or combustion instability may increase.

As one example, the issues described above may be addressed by a method for adjusting a charge air cooler fan or charge air cooler coolant pump and an engine cooling fan and/or vehicle grille shutters based on a target manifold charge air temperature and additional air and coolant temperatures. The additional air and coolant temperatures may include ambient air temperature, CAC coolant temperature, and CAC inlet air temperature.

In one example, one or more of a grille shutter position and an engine cooling fan speed may be adjusted based on a difference between a target manifold charge air temperature and a charge air cooler inlet coolant temperature. The adjustments to the grille shutters and engine cooling fan may be further based on ambient temperature. Additionally, a coolant pump output, such as coolant pump speed, may be adjusted based on a difference between a charge air cooler inlet air temperature and the target charge air cooler air temperature. Adjustments to the coolant pump speed may be further based on a mass air flow rate, a difference between a target coolant temperature and a charge air cooler inlet coolant temperature (e.g., CAC cooling capacity), and a difference between a measured manifold charge air temperature and the target manifold charge air temperature. Using this method, the pump and engine cooling fan may be run only when required based on the above temperature values. As such, controlling the manifold charge air temperature in this way may increase engine operating efficiency and reduce wear on cooling system components while increasing the accuracy and precision of maintaining the target manifold charge air temperature.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
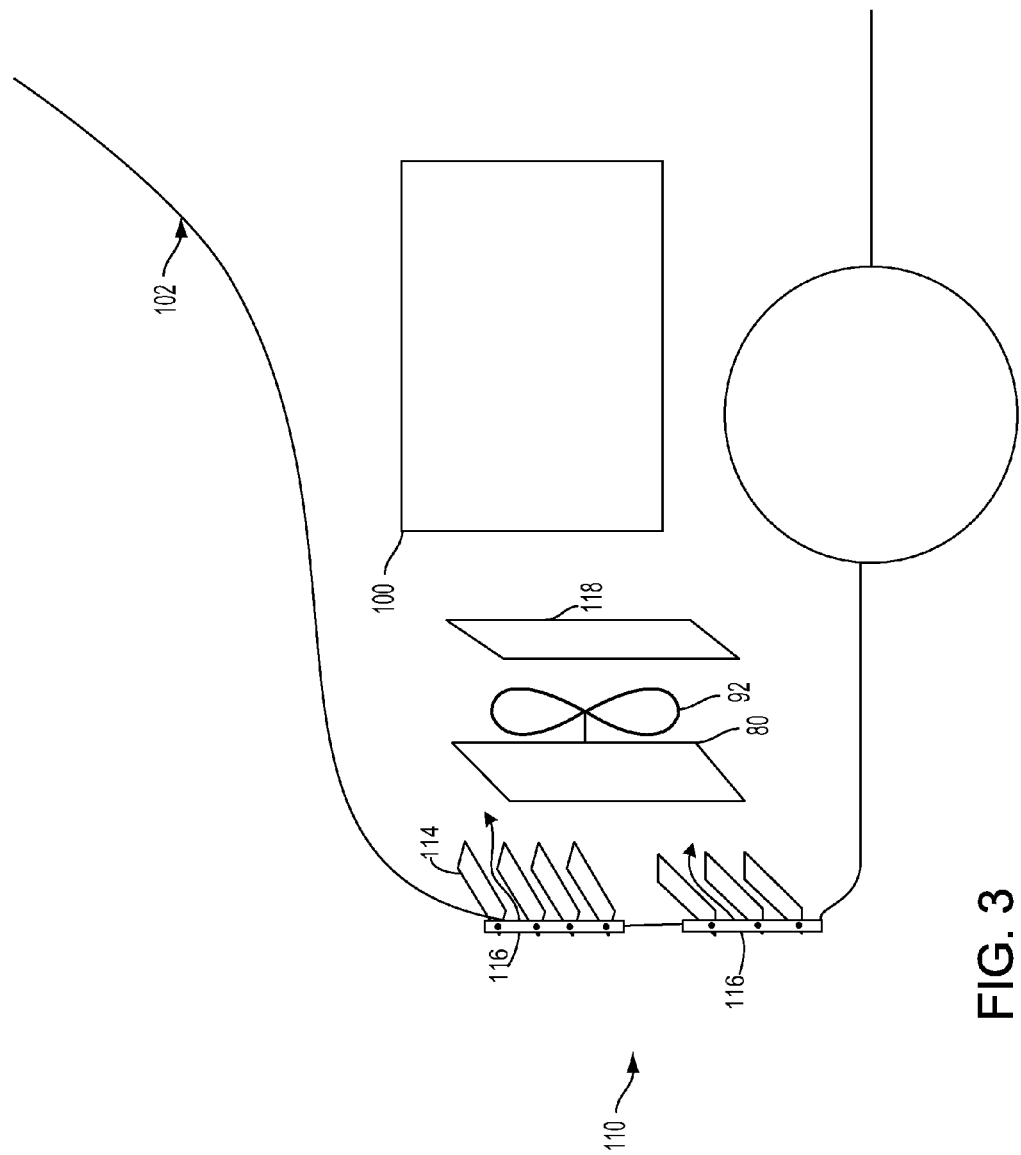
FIG. 3 shows a first embodiment of the CAC, radiator, and engine location within a vehicle with respect to the grille shutters and associated ambient air flow.
Figure 4:
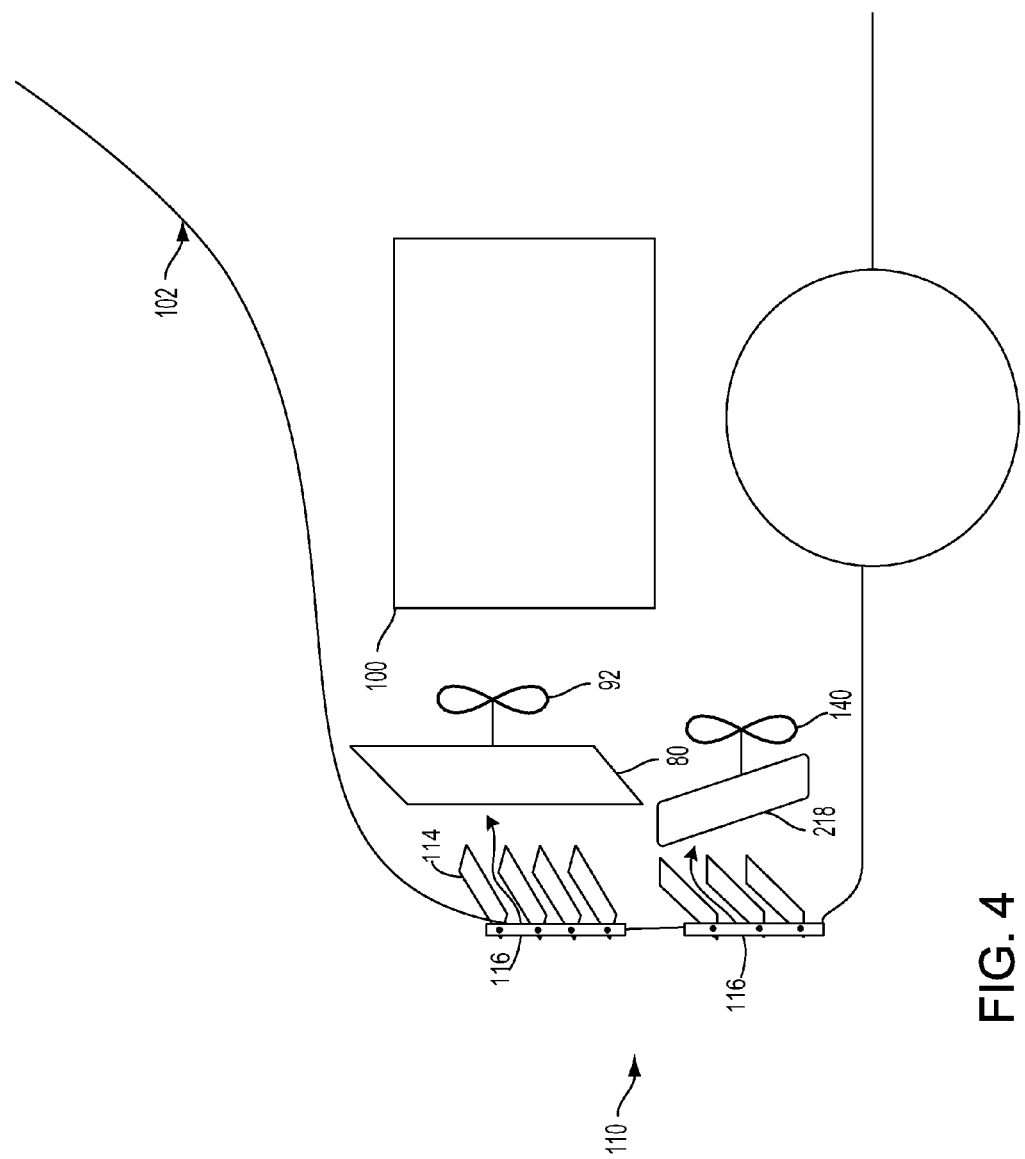
FIG. 4 shows a second embodiment of the CAC, radiator, and engine location within a vehicle with respect to the grille shutters and associated ambient air flow.
Figure 5:
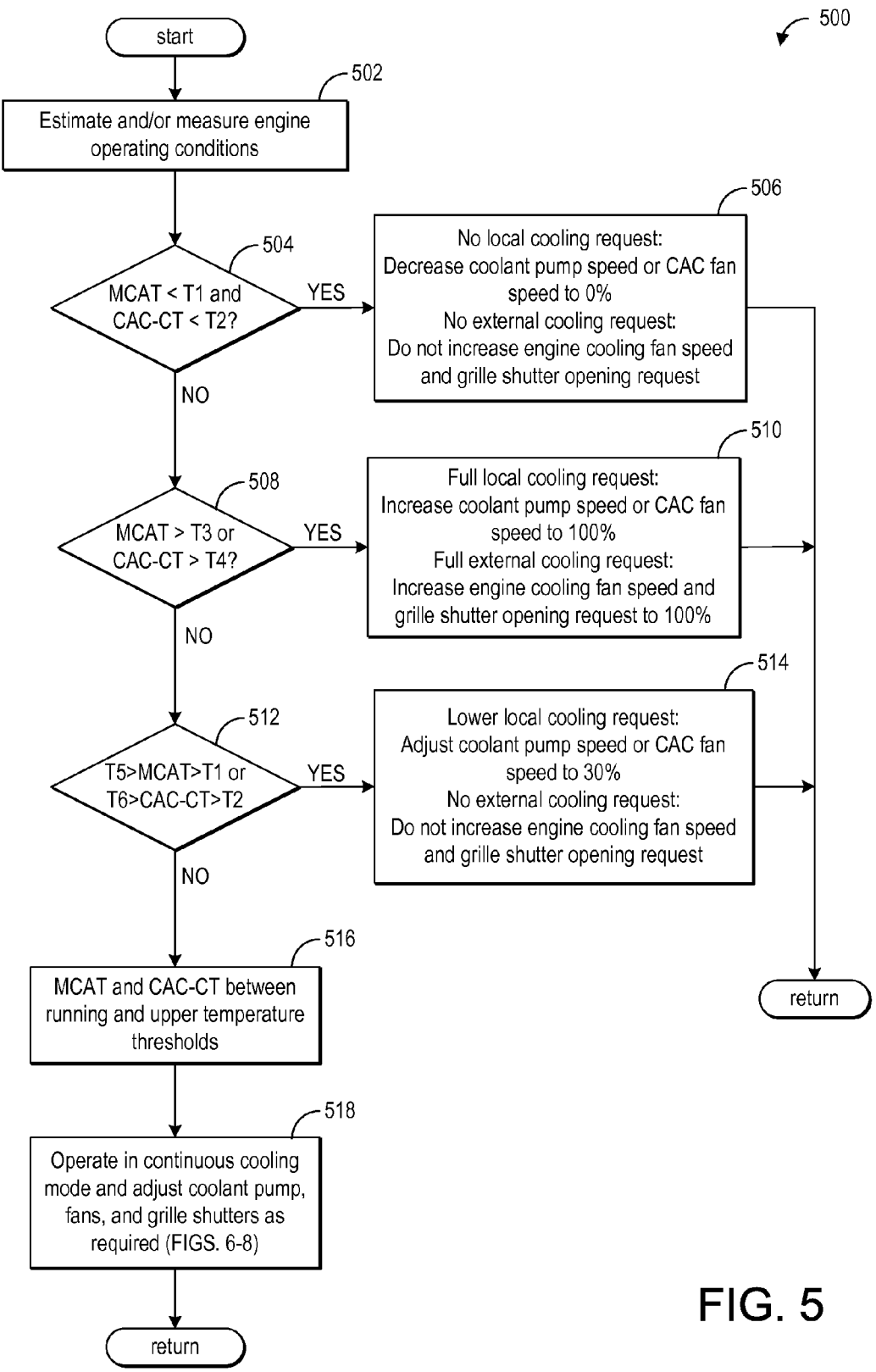
FIG. 5 shows a flow chart of a method for determining a CAC cooling mode.
Figure 7:
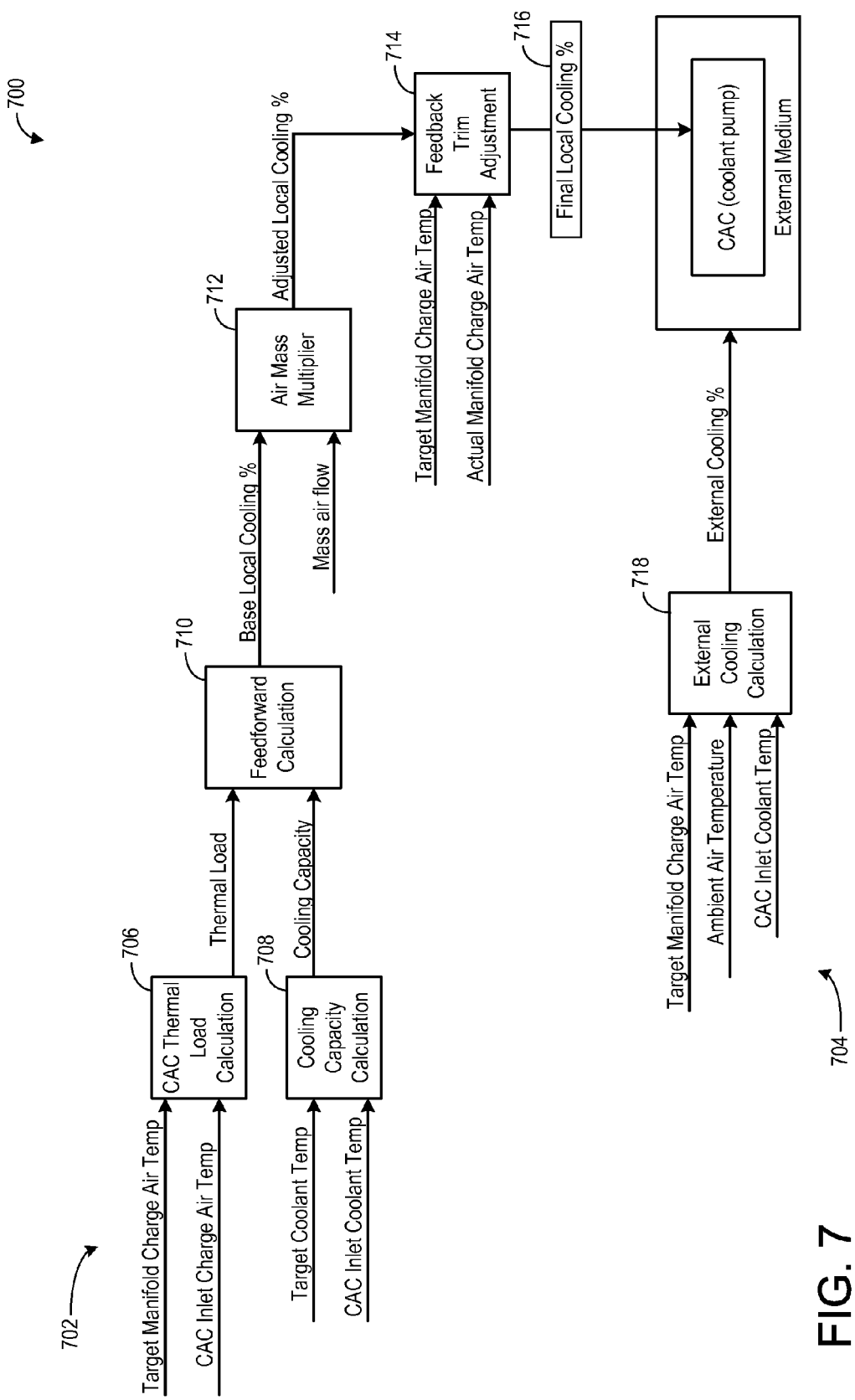
FIG. 7 shows an example diagram illustrating an algorithm for determining local and external cooling percentages for a water-to-air CAC.
Figure 8:
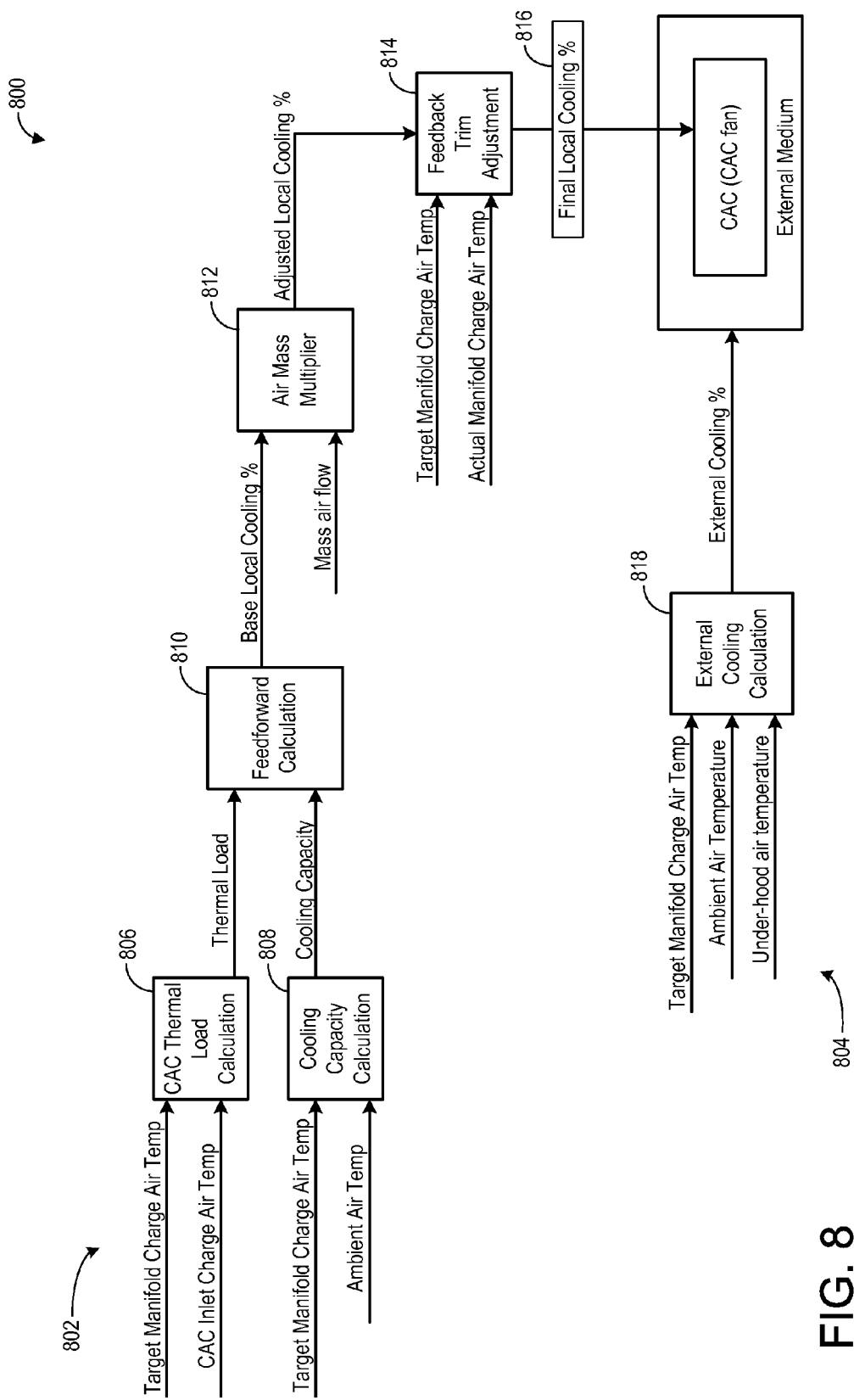
FIG. 8 shows an example diagram illustrating an algorithm for determining local and external cooling percentages for an air-to-air CAC.

The following description relates to systems and methods for adjusting a charge air cooler fan or charge air cooler coolant pump and an engine cooling fan and/or vehicle grille shutters based on a target manifold charge air temperature. Charge air cooling may be provided by a charge air cooler in an engine system, such as the engine systems shown in FIGS. 1-2. The charge air cooler (CAC) may be a water-to-air CAC which cools the charge air with internally circulating coolant or an air-to-air CAC which cools the charge air with ambient airflow across fins of the CAC. In both CAC types, increased ambient airflow from outside the vehicle may increase CAC cooling. By increasing an opening of the grille shutters and/or increasing a speed of the engine cooling fan, ambient airflow to the CAC may be increased. FIGS. 3-4 show positions of the CAC, radiator, and engine within a vehicle with respect to the grille shutters and associated ambient air flow. Based on a measured manifold charge air temperature and a charge air cooler coolant temperature, an engine controller may adjust a cooling mode of the charge air cooler. Based on the cooling mode, the CAC may provide more or less cooling to the charge air traveling through the CAC. FIG. 5 presents a method for determining the CAC cooling mode, based on the measured manifold charge air temperature and the charge air cooler coolant temperature. If the CAC is in a continuous cooling mode, the controller may continually adjust local and external CAC cooling based on engine temperatures. In one example, local cooling may be provided by the coolant pump of a low-temperature radiator circuit and external cooling may be provided by the grille shutters and/or engine cooling fan. A method for adjusting local CAC cooling and external CAC cooling is presented at FIG. 6. A percentage or amount of local and external cooling may be determined by an algorithm which uses various coolant and air temperatures in the engine. FIGS. 7-8 are diagrams illustrating an algorithm for determining local and external cooling percentages for the CAC.

Figure 1:
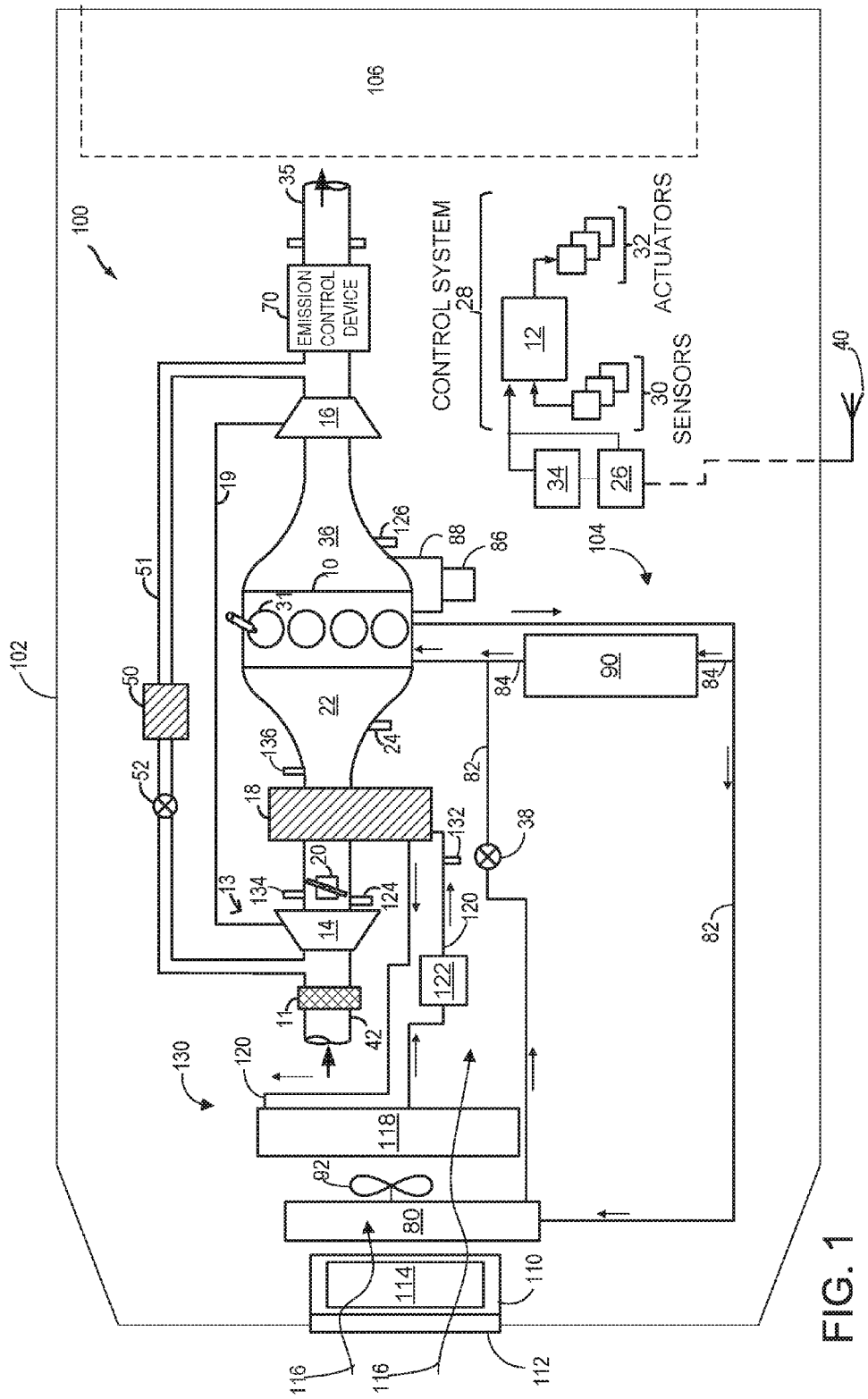
FIG. 1 shows a schematic diagram of a first embodiment of an engine cooling system, a charge air cooler, and associated components in a vehicle.

FIG. 1 shows a first example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions. In yet another embodiment, the turbine and compressor may be included as a supercharger.

As shown in FIG. 1, compressor 14 is coupled, through throttle valve 20, to charge air cooler (CAC) 18. In an alternate embodiment, the throttle valve 20 may be coupled to the engine intake manifold 22, downstream of the CAC 18. From the compressor, the hot compressed air charge passes through the throttle valve 20, enters the inlet of the CAC 18, cools as it travels through the CAC, and then exits to the intake manifold 22. In the embodiment shown in FIG. 1, the CAC 18 is a water-to-air heat exchanger. As such, CAC 18 comprises a series of coolant tubes which water or coolant may flow through to cool the charge air passing over the outside of the coolant tubes. The coolant tubes of CAC 18 may be connected to a low-temperature radiator circuit 130. The low-temperature radiator circuit 130 may include a low-temperature radiator 118, coolant tubing 120, and a coolant pump 122. The low-temperature radiator 118 may cool warmed coolant flowing from the CAC 18. As such, the coolant pump 122 may pump cooled coolant from the low-temperature radiator 118, through the coolant tubing 120, and to the CAC 18. Coolant then flows through the coolant tubes of the CAC 18, thereby cooling warmer charge air passing through the CAC 18. As the coolant travels through the CAC, the temperature of the coolant may increase. Warmed coolant may then travel from the CAC 18 back to the low-temperature radiator 118 to be cooled again.

The low-temperature radiator circuit 130 may also include a temperature sensor 132 for measuring the coolant temperature at the CAC coolant inlet (e.g., CAC coolant temperature, CAC-CT). The coolant pump 122 may be a variable speed pump. As such, a controller 12 may increase or decrease the coolant pump speed in response to engine operating conditions. For example, coolant pump speed may be increased to increase cooling of the charge air passing through the CAC 18. Alternatively, the coolant pump speed may be decreased to reduce cooling of the charge air. As such, adjusting the speed of the coolant pump 122 may adjust local CAC cooling. Further details on controlling the coolant pump are presented below with regard to FIGS. 5-8.

CAC cooling may be further adjusted with external cooling elements. Specifically, ambient air flow 116 from outside the vehicle may enter engine 10 through a grille 112 at a vehicle front end and pass across the low-temperature radiator 118, to aid in cooling the coolant passing through the CAC 18. Thus, increasing ambient air flow 116 across the low-temperature radiator 118 may further affect the coolant's temperature, thereby altering the efficiency and cooling capacity of the CAC 18. For example, increasing ambient air flow 116 across the low-temperature radiator 118 may increase the low-temperature radiator cooling efficiency, thereby decreasing the coolant temperature.

Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. Thus, as elaborated herein with reference to FIGS. 5-8, the temperature at the CAC outlet may be controlled such that condensate formation and engine misfire events are reduced while also sufficiently cooling charge air for combustion.

Engine system 100 may further include a CAC inlet temperature sensor 134 and a CAC outlet temperature sensor 136. The CAC inlet temperature sensor 134 may sense the temperature of the charge air entering the CAC while the CAC outlet temperature sensor 136 may sense the temperature of the charge air exiting the CAC. As such, the CAC outlet temperature sensor 136 may give a reading of the CAC outlet temperature, or manifold charge air temperature. The controller 12 may use data from these sensors to control various cooling elements of the engine system, including an engine cooling fan 92, the coolant pump 122, and an opening of grille shutters 114 (described below). In some embodiments, a second fan may be included in engine system 100, coupled directly to the low-temperature radiator 118.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the coolant line 82, which may be kept closed until the coolant reaches a threshold temperature.

Engine system 100 may include an electric fan or engine cooling fan 92 for directing cooling airflow toward the low-temperature radiator 118, engine cooling system 104, and/or other engine system components. The engine cooling fan 92 may be coupled to radiator 80 in order to maintain airflow through radiator 80 when vehicle 102 is moving slowly or stopped while the engine is running. Fan rotation speed or direction may be controlled by a controller 12 described in more detail hereafter. In one example, the engine cooling 92 fan may also direct cooling airflow across the low-temperature radiator 118. Alternatively, engine cooling fan 92 may be coupled to the engine accessory drive system, driven by the engine crankshaft. In some embodiments, there may be two or more electric fans in the engine system. For example, one may be coupled to the radiator (as shown) for engine cooling, while the other may be coupled elsewhere to direct cooling air directly toward the low-temperature radiator 118. In one example, the other electric fan may be coupled directly to the low-temperature radiator 118 for additional control of coolant temperature. In this example, the two or more electric fans may be controlled separately (e.g., at different rotation speeds) to provide cooling to their respective components.

Engine coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), coolant pump speed, and others. In addition, controller 12 may receive data from the GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate electric fan and grille shutter adjustment. For example, if humidity is greater than a defined threshold, one or more of the grille shutters may be closed and the electric fan may be turned off.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as electric fan 92 and/or grille shutter system 110.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving ambient air flow 116 through or near the front end of the vehicle and into the engine compartment. Such ambient air flow 116 may then be utilized by radiator 80, engine cooling fan 92, and low-temperature radiator 118 to keep the engine and/or transmission cool. The engine cooling fan 92 may be adjusted to further increase or decrease the air flow to the engine components.

Figure 2:
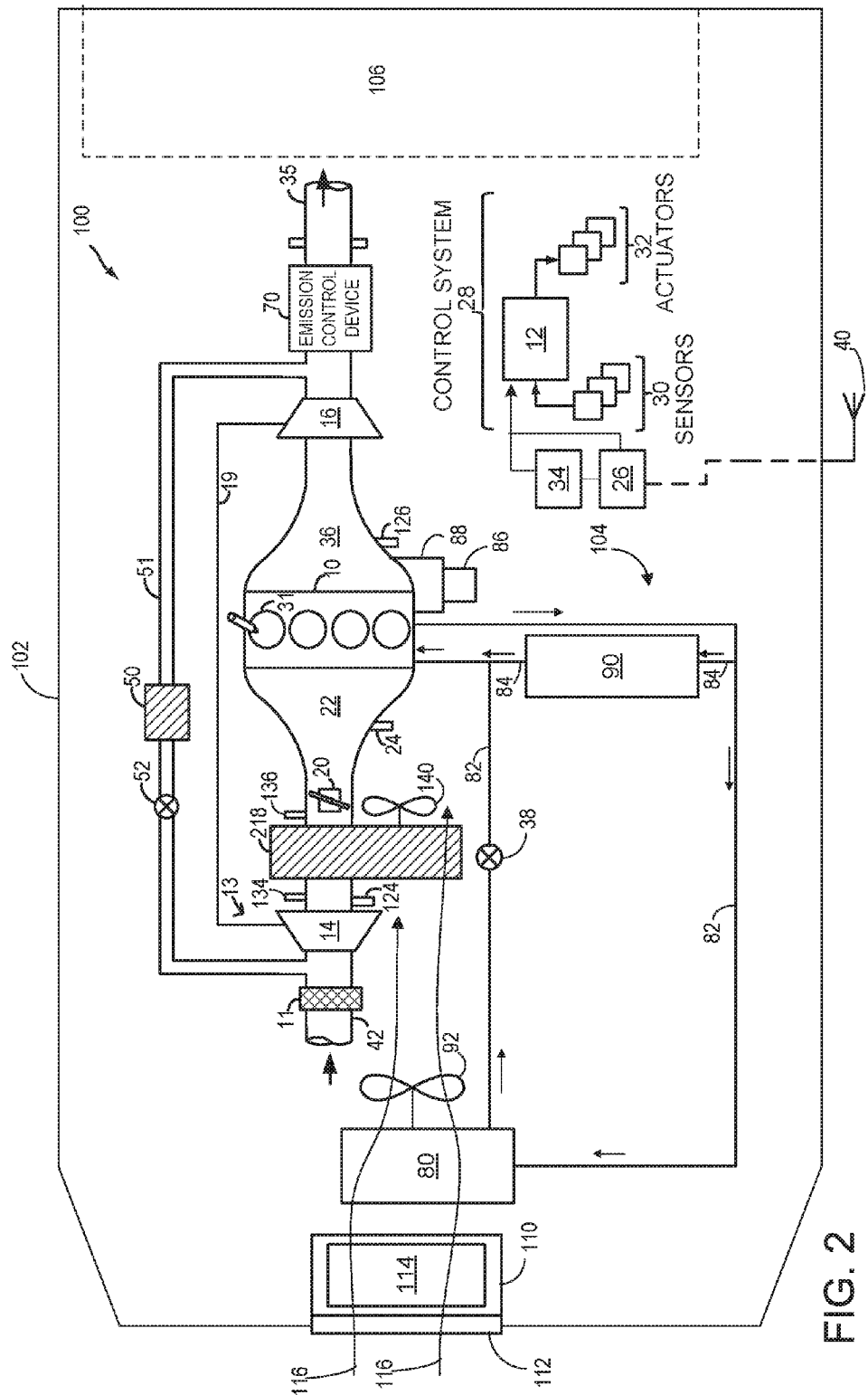
FIG. 2 shows a schematic diagram of a second embodiment of an engine cooling system, a charge air cooler, and associated components in a vehicle.

FIG. 2 shows a second embodiment of a grille shutter system 110 and an engine system 100, in a motor vehicle 102, illustrated schematically. The engine components described above with reference to FIG. 1 may also be included in the second embodiment shown in FIG. 2. As such, like components are correspondingly numbered in FIG. 2. See the above description of FIG. 1 for like component descriptions.

In the second embodiment shown in FIG. 2, a CAC 218 is an air-to-air heat exchanger. As such, the charge air traveling through the CAC 218 is air-cooled rather than coolant-cooled (as shown in FIG. 1). From the compressor 14, the hot compressed air charge enters the inlet of the CAC 218, cools as it travels through the CAC, and then exits to pass through the throttle valve 20 to the intake manifold 22. Ambient air flow 116 from outside the vehicle may enter engine 10 through a grille 112 at a vehicle front end and pass across the CAC, to aid in cooling the charge air.

As shown in FIG. 2, engine system 100 may include an engine cooling fan 92 for directing cooling airflow (e.g., ambient air flow 116) toward the CAC 218, engine cooling system 104, and/or other engine system components. In one example, the engine cooling 92 fan may also direct cooling airflow toward CAC 218. In some embodiments, there may be two or more electric fans in the engine system. For example, one may be coupled to the radiator (as shown) for engine cooling, while the other may be coupled elsewhere to direct cooling air directly toward the CAC. In one example (as shown in FIG. 2), the other electric fan may be coupled directly to the CAC for additional control of local CAC cooling. In this example, each fan may be controlled separately (e.g., at different rotation speeds) to provide cooling to their respective components.

Specifically, a CAC fan 140 may be coupled to the CAC 218 to further aid in cooling the charge air. For example, a controller 12 may increase a rotation speed of the CAC fan 140 to pull ambient air flow 116 toward the CAC 218 and further increase charge air cooling. In an alternate embodiment, the engine cooling fan 92 may provide ambient air flow to both the radiator 80 and the CAC 218. In this embodiment, the CAC 218 may not include the CAC fan 140. Further details on adjusting the CAC fan 140 to control charge air cooling and the temperature of the charge air exiting the CAC 218 are presented below with respect to FIGS. 5-8.

FIGS. 3-4 show two example embodiments of the CAC 18, radiator 80, engine cooling fan 92, and engine system 100 locations within a vehicle 102 with respect to the grille shutters and associated ambient air flow 116. Other under hood components (fuel system, batteries, etc.) may benefit from the cooling air flow as well. Thus, grille shutter system 110 and engine cooling fan 92 may assist cooling system 104 in cooling internal combustion engine 10. Grille shutter system 110 comprises one or more grille shutters 114 configured to adjust the amount of air flow received through grille 112.

In a first embodiment, as shown in FIG. 3, the CAC 18 is a water-to-air CAC. As such, the CAC 18 may be fluidly coupled to a low-temperature radiator 118 and coolant pump 122. In the first embodiment, the coolant pump 122 may control local CAC cooling while the engine cooling fan 92 and/or the grille shutters 114 control external CAC cooling. In a second embodiment, as shown in FIG. 4, the CAC 218 is an air-to-air CAC. As such, the CAC 218 may be cooled by air flow across the outside of the CAC instead of coolant from the low temperature radiator. A CAC fan 140 may be coupled to the CAC 218 to further increase ambient air flow 116 to the CAC 218. In the second embodiment, the CAC fan 140 may control local CAC cooling while the engine cooling fan and/or the grille shutters control external CAC cooling. Further, in the second embodiment, a controller may measure an under-hood temperature to use in control of the CAC fan 140, engine cooling fan 92, and/or the grille shutters 114. In one example, the under-hood temperature may be the temperature of the air at or around the CAC 218. As such, a temperature sensor (not shown) may be disposed underneath the hood of the vehicle 102, nearby the CAC 218.

As shown in FIGS. 3-4, grille shutters 114 may cover a front region of the vehicle spanning from just below the hood to the bottom of the bumper, for example. By covering the CAC intake, drag is reduced and entry of external cooling air into the CAC is reduced. In some embodiments, all grille shutters may be moved in coordination by the controller. In other embodiments, grille shutters may be divided into sub-regions and the controller may adjust opening/closing of each region independently. For example, a first region may include grille shutters that largely affect drag while another affects entry of air into the CAC. In one example, the first sub-region may span from just below the hood to the top of the bumper, while the second sub-region may span from the top of the bumper to the bottom of the bumper. Each sub-region may contain one or more grille shutters. In some examples, each region may contain the same number of grille shutters, while in other examples one sub-region contains more than the other. In one embodiment, the first sub-region may contain multiple grille shutters, while the second sub-region contains one grille shutter. In an alternate embodiment, the first sub-region may only contain one grille shutter, while the second sub-region contains multiple grille shutters.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an opened position and a closed position to provide air flow for cooling engine compartment components at the least loss in fuel economy. This is because closing and/or partially closing grille shutters 114 reduces an amount of air flow received through grille 112, thus reducing the aerodynamic drag on the vehicle. Maintaining the grille shutters in an open position allows for sufficient engine cooling; however, this may also increase drag on the vehicle and decrease fuel economy. On the other hand, closing the grille shutters decreases drag and improves fuel economy; however, this may not allow for sufficient engine cooling. Thus, control of the grille shutters may be based on multiple vehicle operating conditions, discussed further below. In some embodiments, the grille shutters may be used for CAC cooling control only (e.g., maintain a target CAC outlet temperature). In this case, grille shutter operation may have little to no aerodynamic benefit.

When the grille shutters are open, engine cooling fan 92 and/or CAC fan 140 may be used to increase or decrease cooling ambient air flow 116 to engine components, including the CAC 18. For example, by increasing the engine cooling fan and/or CAC fan rotation speed, the amount and rate of air flow to the engine will increase. Conversely, by decreasing the fan rotation speed, the rate of air flow to the engine decreases. In another example, the engine cooling fan and/or CAC fan may be turned on at a low rotation speed to decrease CAC efficiency and increase CAC outlet temperature. Specifically, at low speeds, the engine cooling fan may not be effective in cooling. However, the blades of the fan may act to resist airflow to the radiator and CAC. In this way, ambient air flow velocities directly affect CAC effectiveness and CAC outlet temperature. Thus, by changing fan rotation speed, CAC efficiency and outlet temperature may be altered. When grille shutters are closed, little cooling ambient air flow enters the grille. However, the engine cooling fan and/or CAC fan may still operate to provide air flow. In addition to controlling rotation speed, the engine cooling fan may also change rotation direction. The blades of the fan may be designed such that rotation in a first direction directs air flow toward engine components. In the following descriptions, this will serve as the normal or base direction for fan operation. Rotation of the fan blades in a second direction, opposite the first direction, may direct air flow away from engine components. In this way, fan rotation direction may also be used to alter the cooling air flow reaching engine components and, subsequently, CAC efficiency and outlet temperature.

In some embodiments, control system 28 may be configured to adjust opening of grille shutters 114 responsive to vehicle operating conditions. Adjusting opening of grille shutters 114 may include opening one or more of the grille shutters, closing one or more of the grille shutters, partially opening one or more of the grille shutters, partially closing one or more of the grille shutters, adjusting opening and closing timing, etc. As an example, controller 12 may be communicably connected to grille shutter system 110, and may have instructions stored thereon to adjust opening of grille shutters 114. In this way, controller 12 may adjust vehicle grille shutters by increasing or decreasing grille shutter opening.

Control system 28 may be further configured to operate engine cooling fan 92 and/or CAC fan 140 responsive to vehicle operating conditions. Fan operation may include increasing the fan rotation speed, decreasing the fan rotation speed, stopping the fan rotation, reversing the fan rotation direction, adjusting rotation on/off timing, etc. As an example, controller 12 may be communicably connected to engine cooling fan 92 and/or CAC fan 140, and may have instructions stored thereon to adjust the rotation of engine cooling fan 92 and/or CAC fan 140.

The system of FIGS. 1 and 3 provide for an engine system of a vehicle, the engine system having an engine including an intake manifold. The engine system may further include a compressor coupled to the intake manifold upstream of a throttle, a water-to-air charge air cooler coupled downstream of the compressor, a coolant pump coupled to a water side of the charge air cooler, grille shutters positioned at a vehicle front end, an engine cooling fan, and a controller. In one example, the controller may have computer readable instructions for adjusting one or more of an opening of the grille shutters and a speed of the engine cooling fan based on a difference between a target manifold charge air temperature and a charge air cooler inlet coolant temperature. Additionally, the controller may have computer readable instructions for adjusting a speed of the coolant pump based on a difference between a charge air cooler inlet air temperature and the target manifold charge air temperature and a difference between a target coolant temperature and the charge air cooler inlet coolant temperature. Adjusting the speed of the coolant pump may be further based on mass air flow and a difference between a measured manifold charge air temperature and the target manifold charge air temperature.

The system of FIGS. 2 and 4 provide for an engine system of a vehicle, the engine system having an engine including an intake manifold. The engine system may further include a compressor coupled to the intake manifold upstream of a throttle, an air-to-air charge air cooler coupled downstream of the compressor, a charge air cooler fan coupled to the charge air cooler, grille shutters positioned at a vehicle front end, an engine cooling fan, and a controller. In one example, the controller may have computer readable instructions for adjusting one or more of an opening of the grille shutters and a speed of the engine cooling fan based on a difference between a target manifold charge air temperature and an ambient air temperature (e.g., ambient temperature). Additionally, the controller may have computer readable instructions for adjusting a speed of the charge air cooler fan based on a difference between a charge air cooler inlet air temperature and the target manifold charge air temperature and a difference between the target manifold charge air temperature and the ambient air temperature. Adjusting the speed of the charge air cooler fan may be further based on mass air flow and a difference between a measured manifold charge air temperature and the target manifold charge air temperature.

As described above, a CAC provides cooling to charge air traveling through the CAC and to the intake manifold of the engine. An amount of cooling provided by the CAC may be increased or decreased based on a desired manifold charge air temperature, MCAT (e.g., the temperature of the charge air in the intake manifold, downstream of the CAC and upstream of the engine cylinders). CAC cooling may comprise two components: local CAC cooling and external cooling. Local CAC cooling may include cooling provided directly by or on the hardware of the CAC while external cooling may include cooling provided by an external medium in which the CAC operates. For example, in a water-to-air CAC, local or localized cooling may be provided by coolant circulating through one side of the CAC and exchanging heat with the charge air flowing through a second side of the CAC. In this example, external cooling may be provided by external airflow traveling across the outside of the low-temperature radiator. In this way, external airflow may increase or decrease cooling provided by the low-temperature radiator, thereby affecting the temperature of the coolant passing through the CAC. In another example, in an air-to-air CAC, local cooling may be provided by local airflow traveling across the outside of CAC, generated by a CAC fan coupled to the outside of the CAC. In this example, external cooling may be provided by external airflow (e.g., from an area away from the CAC) traveling across the outside of the CAC. Increasing local and/or external cooling may decrease the MCAT while decreasing local and/or external cooling may increase the MCAT.

In this way, adjusting CAC cooling may include adjusting local CAC cooling and/or external cooling. Various engine components may adjust local and/or external cooling to the CAC. In one example, in a water-to-air CAC, local CAC cooling may be adjusted by adjusting a speed of the coolant pump (of the low-temperature radiator circuit). For example, by increasing coolant pump speed, local cooling provided by the CAC may increase. Conversely, by decreasing coolant pump speed, local CAC cooling may decrease. In another example, in an air-to-air CAC, local CAC cooling may be adjusted by adjusting operation of the CAC fan. For example, by increasing the speed of rotation of the CAC fan, local cooling provided to the CAC may increase. Conversely, by decreasing CAC fan speed, local cooling provided to the CAC may decrease. External cooling to the CAC may be adjusted by adjusting a speed of the engine cooling fan and/or a position of the grille shutters. For example, by increasing an opening of one or more grille shutters, more cooling airflow may enter the engine, thereby increasing external cooling to the CAC. Additionally, or alternatively, increasing engine cooling fan speed may increase airflow to the CAC or the low-temperature radiator, thereby increasing external cooling to the CAC. In another example, decreasing the opening of one or more grille shutters and/or decreasing engine cooling fan speed may decrease external cooling to the CAC.

Engine cooling fan operation, CAC fan operation, coolant pump operation, and/or grille shutter operation may be adjusted based on a target manifold charge air temperature, MCAT. The target MCAT may also be referred to as a target outlet CAC temperature. The target MCAT may be based on a temperature which provides stable combustion while reducing condensate formation in the CAC. As the temperature of the charge air exiting the CAC increases, the controller may increase spark retard to reduce engine knock. However, increasing spark retard may increase combustions stability. As the temperature of the charge air exiting the CAC decreases, condensate formation in the CAC may increase, thereby increasing the likelihood of engine misfire and unstable combustion. Thus, the target MCAT may be set in order to reduce condensate formation while increasing combustion stability.

The controller may use the target MCAT, along with an algorithm and additional system variables, to determine the local and external cooling for the CAC. For example, the output of the algorithm may be a local and/or external cooling request. The local cooling request may be presented as a local cooling percentage, wherein the percentage reflects a percentage of total available local cooling. Similarly, the external cooling request may be presented as an external cooling percentage, wherein the percentage reflects a percentage of total available external cooling.

To determine the local cooling percentage, the controller may first determine a thermal load of the CAC. The thermal load may be based on the target MCAT and a CAC inlet charge air temperature (e.g., temperature of the charge air entering the CAC). The controller may also determine the cooling capacity of the CAC, based on a CAC inlet coolant temperature (e.g., temperature of the coolant entering the CAC) and a target coolant temperature. The target coolant temperature may be based on the target manifold charge air temperature and ambient temperature. The thermal load and cooling capacity may then be used in a feed-forward calculation to determine a base local cooling percentage. The base local cooling percentage may then be adjusted based on the mass air flow traveling through the CAC. The adjusted local cooling percentage may then be trimmed higher or lower based on a difference between the target MCAT and the actual, measured, MCAT. This may result in a final local cooling percentage.

The controller may then use the final local cooling percentage to adjust the CAC coolant pump or the CAC fan. For example, if the CAC is a water-to-air CAC, the controller may adjust the coolant pump speed to a level which provides the final local cooling percentage. In one example, a final local cooling percentage of 100% may result in increasing the coolant pump speed to 100% of a maximal pump speed. In another example, if the CAC is an air-to-air CAC, the controller may adjust the CAC fan speed to a level which provides the local cooling percentage. For example, a final local cooling percentage of 50% may result in adjusting the CAC fan speed to 50% of a maximal fan speed.

To increase operating efficiency and reduce feed-forward cooling control requests, external cooling may be adjusted. To determine the external cooling percentage, the controller may first determine an ambient air temperature and a CAC inlet coolant temperature, if the CAC is a water-to-air CAC. The external cooling percentage may then be based on the ambient air temperature vs. the CAC inlet coolant temperature and the target MCAT.

The controller may then use the external cooling percentage to adjust the grille shutters and/or the engine cooling fan. In one example, the controller may adjust only one of the engine cooling fan and the grille shutters to deliver the determined external cooling percentage. For example, if the external cooling percentage is determined to be 60%, the grille shutters may be adjusted to a position which corresponds to 60% of maximal cooling provided by the grille shutters. In one example, this may include opening the grille shutters to 60% of a maximal opening. Alternatively, the engine cooling fan may be adjusted to deliver an external cooling percentage of 60%. For example, this may include increasing the engine cooling fan speed to 60% of a maximal fan speed.

In another example, the controller may adjust both the engine cooling fan and the grille shutters to deliver the determined external cooling percentage. Specifically, the external cooling request may be divided between the engine cooling fan and the grille shutters. In one example, if the external cooling percentage is determined to be 60%, the grille shutters may provide 40% of the external cooling while the engine cooling fan provides 20% of the external cooling. In another example, the grille shutters may provide 25% of the external cooling while the engine cooling fan provides 35% of the external cooling request.

Managing the external cooling request between the grille shutters and the engine cooling fan may be based on additional vehicle operation conditions. The additional vehicle operating conditions may include engine temperatures, vehicle driving conditions, and outside weather conditions. For example, the grille shutters and engine cooling fan may be adjusted to provide the external cooling percentage request while also providing adequate engine cooling and increasing vehicle fuel economy.

Opening the grille shutters may increase drag of the vehicle. Thus, in some examples, when the vehicle is accelerating the grille shutters may be closed to reduce drag and improve fuel economy. In some cases, during deceleration, the vehicle may be shut down and the transmission disconnected from the engine to improve fuel economy. In this situation, additional cooling of the engine is needed. Opening of the grille shutters and increasing engine cooling fan speed at the beginning of deceleration in this case may allow for pre-cooling of the engine, keeping engine temperatures low. This may also allow the grille shutters to remain closed for a longer period during the following driven conditions, reducing vehicle drag and again improving fuel economy.

In the above examples, if there is a request to close the grille shutters to increase fuel economy, the external cooling percentage may be provided by the engine cooling fan and not by increasing the opening of the grille shutters. In another example, if ambient humidity is high and may increase condensate formation in the CAC, the grille shutters may remain closed and the external cooling percentage may be provided by the engine cooling fan. In this way, the contributions of the engine cooling fan and the grille shutters to the external cooling percentage may be based on additional vehicle and engine operating conditions. As such, the engine cooling fan and the grille shutters may be adjusted to provide the external cooling percentage while also providing adequate engine cooling and increasing vehicle fuel economy. If there is no request to adjust external cooling (e.g., external cooling percentage is substantially equal to the current cooling percentage provided by the engine cooling fan and grille shutters), the engine cooling fan and grille shutters may be adjusted based on vehicle operating conditions, as described above.

In this way, one or more of a grille shutter position and an engine cooling fan speed may be adjusted based on a difference between a target manifold charge air temperature and a temperature of the charge air cooler cooling medium. Further, a local charge air cooler cooling element may be adjusted based on a difference between a charge air cooler inlet charge air temperature and the target manifold charge air temperature. In one example, the charge air cooler is a water-to-air charge air cooler, the charge air cooler cooling medium is a coolant, and adjusting the local charge air cooler cooling element includes adjusting a coolant pump speed. Adjusting the coolant pump speed may be further based on a mass air flow rate, a difference between a target coolant temperature and a charge air cooler inlet coolant temperature, and a difference between a measured manifold charge air temperature and the target manifold charge air temperature. The target coolant temperature is based on the target manifold charge air temperature with the target coolant temperature decreasing for decreasing target manifold charge air temperature. Adjusting one or more of the grille shutter position and the engine cooling fan speed may be further based on an ambient temperature.

In another example, the charge air cooler may be an air-to-air charge air cooler, the charge air cooler cooling medium is under-hood air, and adjusting the local charge air cooler cooling element includes adjusting a charge air cooler fan. In this example, adjusting the charge air cooler fan may be further based on a mass air flow rate, a difference between the target manifold charge air temperature and the temperature of the ambient air, and a difference between a measured manifold charge air temperature and the target manifold charge air temperature. Adjusting one or more of the grille shutter position and the engine cooling fan speed may be further based on vehicle speed, engine temperatures, and outside weather conditions.

Charge air cooling at the CAC may be controlled in response to a manifold charge air temp, MCAT, and, if the CAC is a water-to-air heat exchanger, a coolant temperature of the coolant flowing through the CAC (e.g., CAC coolant temperature, CAC-CT). Specifically, based on the MCAT and the CAC-CT, the CAC may be in various cooling modes which require varying amounts of local and external CAC cooling. For example, based on these temperatures with respect to threshold values, the CAC may be in a full cooling mode, a zero cooling mode, a minimal preventative cooling mode, or a continuous cooling mode.

FIG. 5 presents an example method 500 for determining the CAC cooling mode. Method 500 may be carried out by a control system of a vehicle, such as controller 12. The method begins at 502 by estimating and/or measuring engine operating conditions. Engine operating conditions may include engine speed and load, ambient temperature and humidity, CAC inlet charge air temperature, CAC outlet charge air temperature (e.g., manifold charge air temperature), CAC inlet coolant temperature (e.g., CAC-CT), mass air flow, coolant pump speed, grille shutter position, engine cooling fan speed, CAC fan speed, engine temperatures (e.g., engine coolant temperature and under-hood temperature), etc. Method 500 compares MCAT and CAC-CT to threshold values to determine the CAC cooling mode. If the CAC is an air-to-air CAC, method 500 may be modified such that an under-hood temperature, or temperature of the engine system, is compared to threshold values, instead of the CAC-CT.

At 504, the method includes determining if the MCAT is below a first threshold temperature, T1 and the CAC-CT is below a second threshold temperature, T2. In one example, the first threshold temperature T1 and the second threshold temperature T2 may be minimum thresholds. For example, if the MCAT and/or the CAC-CT are below their respective thresholds (e.g., T1 and T2), CAC cooling may be too high. In this case, condensate may form in the CAC. If the MCAT is below the first threshold T1 and the CAC-CT is below the second threshold temperature T2, the CAC may be transitioned into the zero cooling mode at 506. As such, the controller may generate no local cooling request and no external cooling request. For example, at 506, the controller may decrease coolant pump speed or the CAC fan speed (depending on whether the CAC is a water-to-air CAC or air-to-air CAC) to 0%. This may include turning off the coolant pump or the CAC fan such that no local cooling is provided to the CAC. In this mode, the controller may also not increase the engine cooling fan speed and grille shutter opening request. In one example, this may include closing the grille shutters and/or turning off the engine cooling fan. In another example, this may include allowing the grille shutters and/or engine cooling fan to be controlled based on other engine operating conditions such as vehicle speed and engine coolant temperature.

Returning to 504, if the MCAT is not below the first threshold temperature T1 or the CAC-CT is not below the second threshold temperature T2, the method continues on to 508. At 508, the method determines if the MCAT is greater than a third threshold temperature T3 or the CAC-CT is greater than a fourth threshold temperature T4. In one example, the third threshold temperature T3 and the fourth threshold temperature T4 may be maximum thresholds. For example, if the MCAT and/or the CAC-CT are above their respective thresholds (e.g., T3 and T4), CAC cooling may be too low. In this case, the MCAT may be at a level such that engine knock and/or unstable combustion may occur. Thus, the third threshold temperature T3 and the fourth threshold temperature T4 may be based on a MCAT that may result in unstable combustion. If the MCAT is greater than the third threshold temperature T3 or the CAC-CT is greater than the fourth threshold temperature T4, the CAC may be transitioned into the full cooling mode at 510. As such, the controller may generate a full, or maximal, local cooling request and a full external cooling request. In this case the local and external cooling percentages or requests may be 100%. The method at 510 may include increasing coolant pump speed or CAC fan speed to 100% (e.g., maximal speed). The full external cooling request may include increasing the engine cooling fan speed and grille shutter opening request to 100%. In one example, this may include increasing engine cooling fan speed to 100% and increasing the opening of the grille shutters to 100% (e.g., maximum amount of opening). In another example, this may include increasing the engine cooling fan speed and grille shutter opening to the highest level allowed by other engine operating conditions. This may be based on fuel economy of the vehicle. For example, if the vehicle is accelerating during the full cooling mode, the engine cooling fan speed may be increased to 100% while the grille shutters are opened to a smaller percentage than 100% based on vehicle fuel economy. If losses due unstable combustion at the higher MCAT are greater than fuel economy losses, the grille shutters may then be opened to 100%.

Returning to 508, if the MCAT is below the third threshold temperature T3 and the CAC-CT is below the fourth threshold temperature T4, the method continues on to 512. At 512, the method includes determining if the MCAT is between the first threshold temperature T1 and a fifth threshold temperature, T5, or if the CAC-CT is between the second threshold temperature T2 and a sixth threshold temperature, T6. The fifth threshold temperature T5 and the sixth threshold temperature T6 may be minimum normal running temperatures of the engine. For example, if the MCAT and/or CAC-CT are above the fifth threshold temperature T5 and/or the sixth threshold temperature T6, respectively, minimal cooling intervention may be needed. If the MCAT is between the first threshold temperature T1 and a fifth threshold temperature T5 or if the CAC-CT is between the second threshold temperature T2 and a sixth threshold temperature T6, the CAC may be transitioned into the minimal preventative cooling mode at 514. As such, the controller may generate a lower local cooling request and no external cooling request. The lower local cooling request may include adjusting the coolant pump speed or the CAC fan speed to 30%. In one example, 30% may be a minimum speed or duty cycle for the pump or fan (e.g., minimum operational speed for operating the fan or pump and obtaining accurate local and/or external cooling percentages). Thus, in some examples, the local cooling percentage at 514 may be something smaller or larger than 30%, based on the minimum operation speed of the coolant pump or CAC fan for obtaining accurate cooling percentages. At 514, the controller may not increase the engine cooling fan speed and grille shutter opening request. This may include operating the grille shutters and engine cooling fan based on other engine operating conditions such as vehicle speed and engine coolant temperature.

Returning to 512, if the MCAT is not between the first threshold temperature T1 and a fifth threshold temperature T5 and the CAC-CT is not between the second threshold temperature T2 and a sixth threshold temperature T6, the method continues on to 516. At 516, the controller may determine that the MCAT and the CAC-CT are between running (e.g., fifth threshold temperature T5 and sixth threshold temperature T6, respectively) and upper (e.g., third threshold temperature T3 and fourth threshold temperature T4, respectively) temperature thresholds. As such, the controller may operate the CAC in a continuous cooling mode at 518. This may include adjusting the coolant pump, engine cooling fan, CAC fan, and/or grille shutters as required, based on a target MCAT and additional engine temperatures. Details on operating in the continuous cooling mode are presented at FIGS. 6-8.

Figure 6:
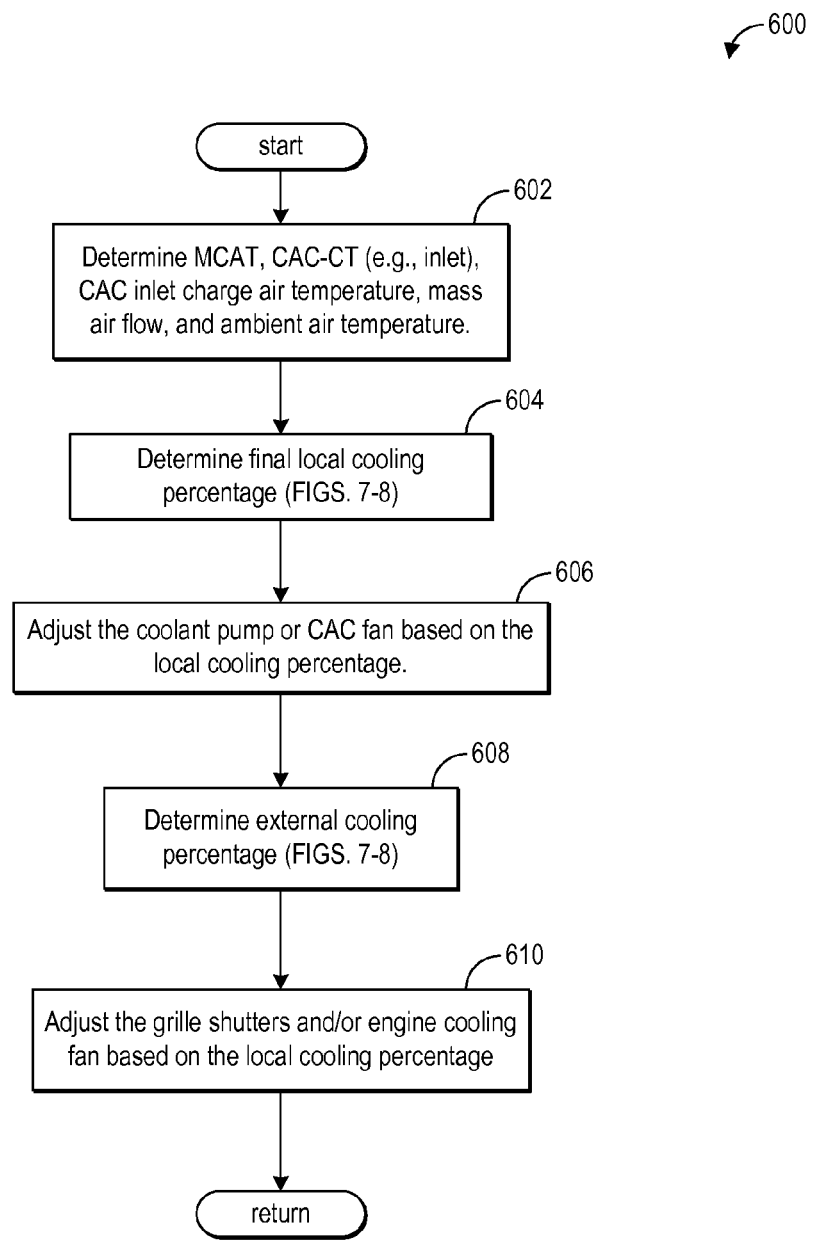
FIG. 6 shows a flow chart of a method for adjusting local and external CAC cooling based on engine temperatures.

An example method 600 for adjusting local and external CAC cooling based on determined local cooling and external cooling percentages is presented at FIG. 6. Method 600 may be carried out by a control system of a vehicle, such as controller 12, by measuring various engine operating parameters from various sensors and using an algorithm to determine a local cooling percentage request and an external cooling percentage request. The method begins at 602 by determining MCAT, CAC-CT (e.g., coolant temperature at the CAC coolant inlet), CAC inlet charge air temperature, mass air flow, and ambient air temperature. At 604, the controller uses the data determined at 602 to determine a final local cooling percentage. The final local cooling percentage may be determined using an algorithm presented at FIGS. 7-8. The final local cooling percentage may be a percentage out of a maximal amount of local cooling that may be provided by the CAC fan or the CAC coolant pump, depending on the type (e.g., air-to-air vs. water-to-air) of CAC.

After determining the local cooling percentage, the controller may adjust the coolant pump or the CAC fan based on the local cooling percentage at 606. Specifically, based on the local cooling percentage, the controller may determine the required coolant pump speed or CAC fan speed. For example, if the local cooling percentage is 50%, the controller may adjust the coolant pump or CAC fan to 50% of the maximal coolant pump or CAC fan speed. If at 606 the coolant pump speed or CAC fan speed is below the determined required coolant pump speed or CAC fan speed, the method may include increasing the coolant pump speed or CAC fan speed to the determined percentage. Alternatively, if at 606 the coolant pump speed or CAC fan speed is greater than the determined required coolant pump speed or CAC fan speed, the method may include decreasing the coolant pump speed or CAC fan speed to the determined percentage. If at 606 the coolant pump speed or CAC fan speed is substantially equal to the determined required coolant pump speed or CAC fan speed, the method may include maintaining the coolant pump speed or CAC fan speed at the current speed.

After adjusting the coolant pump or CAC fan to deliver the determined local cooling percentage, the method continues on to 608 to determine the external cooling percentage. The external cooling percentage may be determined using an algorithm presented at FIGS. 7-8. The external cooling percentage may be a percentage out of a maximal amount of external cooling that may be provided by the grille shutters and/or the engine cooling fan.

After determining the external cooling percentage, the controller may adjust the grille shutters and/or the engine cooling fan, based on the external cooling percentage, at 610. Specifically, based on the local cooling percentage, the controller may determine the required grille shutter opening and engine cooling fan speed. As described above, the external cooling percentage may be divided between the grille shutters and engine cooling fan. As such, the portion of the external cooling percentage provided by the grille shutters and the engine cooling fan may be based on additional engine operating conditions. For example, if other engine or vehicle operating conditions require the grille shutters to be closed or at a smaller opening (such as for fuel economy when accelerating), the external cooling percentage may be provided primarily by the engine cooling fan. For example, in this case, if the external cooling percentage is determine to be 40%, the engine cooling fan speed may be adjusted to 40% of maximal speed while the grille shutters remain closed (or at the smaller opening). In this way, engine cooling fan and grille shutter usage may be based on the external cooling percentage and on vehicle operating conditions such as vehicle speed and engine temperatures.

If at 610 the external cooling provided by the current grill shutter opening and engine cooling fan speed is below the determined external cooling percentage, the method may include increasing the grille shutter opening and/or engine cooling fan speed to deliver the determined external cooling percentage. As described above, the amount of increasing the grille shutter opening vs. the amount of increasing the engine cooling fan speed may be based on additional vehicle operating conditions. In some embodiments, the controller may increase the grille shutter opening to a larger amount so engine cooling fan speed may be maintained at a lower speed. As such, engine cooling fan wear and energy expenditure may be decreased.

Alternatively, if at 610 the external cooling provided by the current grill shutter opening and engine cooling fan speed is greater than the determined external cooling percentage, the method may include decreasing the grille shutter opening and/or engine cooling fan speed to deliver the determined external cooling percentage. In one example, this may include decreasing the engine cooling fan speed while maintaining the grille shutter opening. In another example this may include decreasing the grille shutter opening while maintaining the engine cooling fan speed. In yet another example, this may include decreasing both the engine cooling fan speed and the grille shutters opening. If at 610 the external cooling provided by the current grille shutter opening and engine cooling fan speed is substantially equal to the determined external cooling percentage, the method may include maintaining the grille shutter opening and the engine cooling fan speed. Alternatively, if the engine cooling fan or grille shutters must be adjusted for fuel economy or increased vehicle performance, the controller may adjust the other external cooling device (e.g., the grille shutters if the engine cooling fan is adjusted for fuel economy) to deliver the determined external cooling percentage.

In some embodiments, the method at 604 and 608 may occur concurrently. Thus, the engine cooling fan and grille shutters may be adjusted at the same time at the coolant pump or the CAC fan. Further, the local cooling percentage and external cooling percentage may be continuously calculated or determined such that the grille shutters, engine cooling fan, CAC fan, and/or coolant pump may be continuously adjusted to maintain the MCAT near the target MCAT. In this way, condensate formation may be reduced while increasing combustion stability.

FIG. 7 shows an example diagram 700 illustrating an algorithm for determining local and external cooling percentages for a water-to-air CAC. The algorithm shown in diagram 700 may be stored in and performed by a control system of a vehicle, such as controller 12. Specifically, controller 12 may use the engine operating parameters determined at 602 in method 600 to determine the local cooling percentage and the external cooling percentage. These percentages are then used in method 600 to adjust the CAC fan, CAC coolant pump, engine cooling fan, and/or grille shutters.

The local cooling calculation is presented at 702. First, the controller may calculate the thermal load of the CAC at 706 by determining the difference between the CAC inlet charge air temperature and the target manifold charge air temperature. The manifold charge air temperature may be the same as the CAC outlet charge air temperature. At 708, the controller calculates the cooling capacity of the CAC by determining the difference between a target coolant temperature and the CAC inlet coolant temperature (e.g., CAC-CT). The target coolant temperature may be based on the target manifold charge air temperature. As such, the target coolant temperature may be lower for a lower target manifold charge air temperature.

At 710, controller 12 may utilize a feed forward calculation to determine a base local cooling percentage based on the determined thermal load and cooling capacity. In one example, the controller may include a 3-dimensional lookup table which compares a thermal load to a cooling capacity and determines the base local cooling percentage for the thermal load and cooling capacity values.

CAC efficiency may be related to how much airflow is passing through the CAC. Thus, the controller may determine a multiplication factor, based on the mass air flow (e.g., amount of airflow traveling through the CAC), at 712. The base cooling percentage is then multiplied by the determined multiplication factor in order to determine an adjusted local cooling percentage. The controller then trims the adjusted local cooling percentage based on the difference between the actual, or measured, manifold charge air temperature and the target manifold charge air temperature at 714. The controller may increase or decrease the adjusted local cooling percentage by an amount based on the magnitude of the difference between the measured manifold charge air temperature and the target manifold charge air temperature. For example, if the measured manifold charge air temperature is less than the target manifold charge air temperature, the controller may decrease the adjusted local cooling percentage by an amount based on the magnitude of the difference between the measured manifold charge air temperature and the target manifold charge air temperature. In this example, the amount of decrease in the adjusted local cooling percentage may increase with increasing magnitude of the difference between the measured manifold charge air temperature and the target manifold charge air temperature. In another example, if the measured manifold charge air temperature is greater than the target manifold charge air temperature, the controller may increase the adjusted local cooling percentage by an amount based on the magnitude of the difference between the measured manifold charge air temperature and the target manifold charge air temperature. In this example, the amount of increase in the adjusted local cooling percentage may increase with increasing magnitude of the difference between the measured manifold charge air temperature and the target manifold charge air temperature. Stated another way, the local cooling percentage may increase with increasing difference between the measured manifold charge air temperature and the target manifold charge air temperature.

The output at 716 is a final local cooling percentage. This final local cooling percentage is then used by the controller to determine adjustments to the CAC coolant pump, as described above at FIG. 6.

The external cooling calculation is presented at 704. The external cooling percentage request may be based on a function of the cooling medium temperature vs. the external environment temperature available to reject heat. In the case of the water-to-air CAC, as shown in FIG. 7, the cooling medium is the coolant circulated by the coolant pump, through the CAC, and the external environment temperature is the ambient temperature. The controller may determine the external cooling percentage at 718 based on a difference between the target manifold charge air temperature and the CAC inlet coolant temperature. The higher the coolant temperature rises towards the target manifold charge air temperature, the more external cooling may be requested. In other words, as the difference between the target manifold charge air temperature and the CAC inlet coolant temperature decreases, the external cooling percentage or request may increase. The external cooling percentage may be further based on the ambient temperature. For example, the controller may determine a scaling factor based on the ambient temperature. In one example, if the ambient temperature is higher, the external cooling percentage may be reduced since the higher ambient temperature may provide less cooling to the low-temperature radiator and subsequently the CAC. In this example, opening the grille shutters and/or operating the engine cooling fan may decrease total system efficiency since there may be a lower external cooling benefit. Then, if the final external cooling percentage is lower, the local cooling calculation at 702 may increase the local cooling percentage instead. In another example, if the ambient temperature is lower, the external cooling percentage may be increased since the lower ambient temperature may provide increased cooling to the low-temperature radiator and subsequently to the CAC through the cooled coolant.

The output from 718 is an external cooling percentage. This external cooling percentage is then used by the controller to determine adjustments to the grille shutters and engine cooling fan, as described above at FIG. 6.

FIG. 8 shows an example diagram 800 illustrating an algorithm for determining local and external cooling percentages for an air-to-air CAC. The algorithm shown in diagram 800 may be similar to the algorithm shown in diagram 700. As such, many of the same calculations may be made while some input parameters differ. For example, since diagram 800 presents an algorithm for an air-to-air CAC the algorithm does not use coolant temperature. Instead, ambient air temperature may be used to represent the temperature of the cooling medium (instead of coolant temperature). The algorithm shown in diagram 800 may be stored in and performed by a control system of a vehicle, such as controller 12. Specifically, controller 12 may use the engine operating parameters determined at 602 in method 600 to determine the local cooling percentage and the external cooling percentage. These percentages are then used in method 600 to adjust the CAC fan, CAC coolant pump, engine cooling fan, and/or grille shutters.

The local cooling calculation is presented at 802. First, the controller may calculate the thermal load of the CAC at 806 by determining the difference between the CAC inlet charge air temperature and the target manifold charge air temperature. At 808, the controller calculates the cooling capacity of the CAC by determining the difference between a target manifold charge air temperature and the ambient temperature As described above at 710 in diagram 700, at 810, controller 12 may utilize a feed forward calculation to determine a base local cooling percentage based on the determined thermal load and cooling capacity. The controller may then determine the multiplication factor based on the mass air flow at 712. The base cooling percentage is then multiplied by the determined multiplication factor in order to determine the adjusted local cooling percentage. The controller then trims the adjusted local cooling percentage based on the difference between the actual or measured manifold charge air temperature and the target manifold charge air temperature at 814. The process at 814 may be the same as described for 714 in diagram 700 above. The output at 814 is a final local cooling percentage. This final local cooling percentage is then used by the controller to determine adjustments to the CAC coolant pump, as described above at FIG. 6.

The external cooling calculation is presented at 804. The external cooling percentage request may be based on a function of the cooling medium temperature vs. the external environment temperature available to reject heat. In the case of the air-to-air CAC, as shown in FIG. 8, the cooling medium is the under-hood air or the engine compartment air and the external environment temperature is the under-hood air temperature or the engine compartment air temperature. As such, the charge air cooler cooling medium temperature is under-hood air temperature. The controller may determine the external cooling percentage at 818 based on a difference between the target manifold charge air temperature and the under-hood air temperature. The higher the under-hood air temperature rises towards the target manifold charge air temperature, the less external cooling may be requested. In other words, as the difference between the target manifold charge air temperature and the under-hood air temperature decreases, the external cooling percentage or request may decrease. As described above, the external cooling percentage may be further based on the ambient temperature. For example, the controller may determine a scaling factor based on the ambient temperature. In one example, if the ambient temperature is higher, the external cooling percentage may be reduced since the higher ambient temperature may provide less cooling to the CAC. In this example, opening the grille shutters and/or operating the engine cooling fan may decrease total system efficiency since there may be a lower external cooling benefit. Then, if the final external cooling percentage is lower, the local cooling calculation at 802 may increase the local cooling percentage instead. In another example, if the ambient temperature is lower, the external cooling percentage may be increased since the lower ambient temperature may provide increased cooling to the CAC.

The output from 818 is an external cooling percentage. This external cooling percentage is then used by the controller to determine adjustments to the grille shutters and engine cooling fan, as described above at FIG. 6.

In this way, a local cooling percentage for a charge air cooler may be estimated based on a difference between a charge air cooler inlet air temperature and a target manifold charge air temperature and a cooling capacity of the charge air cooler. An external cooling percentage for a charge air cooler may be estimated based on a difference between a target manifold charge air temperature and a temperature of the charge air cooler cooling medium. Then, one of a coolant pump speed or a charge air cooler fan speed may be adjusted based on the local cooling percentage. Finally, a grille shutter position may be adjusted by a first amount and an engine cooling fan speed may be adjusted by a second amount, the first and second amounts based on the external cooling percentage and vehicle operating conditions. Further, the first amount and the second amount may be determined based on one or more of a vehicle speed, engine temperatures, and outside weather conditions.

The local cooling percentage may be further based on a mass air flow and a difference between a measured manifold charge air temperature and the target manifold charge air temperature. The local cooling percentage may increase with increasing mass air flow and increasing difference between the measured manifold charge air temperature and the target manifold charge air temperature. The external cooling percentage may be further based on ambient temperature with the external cooling percentage decreasing with increasing ambient temperature.

In one example, the charge air cooler may be a water-to-air charge air cooler and the cooling capacity may be based on a difference between a target coolant temperature and a charge air cooler inlet coolant temperature. Further, the coolant pump speed may be determined based on the estimated local cooling percentage. In some cases, the coolant pump speed may increase for increasing local cooling percentage. For the water-to-air charge air cooler, the temperature of the charge air cooler cooling medium is a charge air cooler inlet coolant temperature and wherein the external cooling percentage increases as the difference between the target manifold charge air temperature and the charge air cooler inlet coolant temperature decreases.

In another example, the charge air cooler may be an air-to-air charge air cooler and the cooling capacity may be based on a difference between the target manifold charge air temperature and ambient temperature. Further, the charge air cooler fan speed may be determined based on the estimated cooling percentage. The charge air cooler fan speed may increase for increasing local cooling percentage. For the air-to-air charge air cooler, the temperature of the charge air cooler cooling medium is under-hood air temperature. The external cooling percentage may decrease as the difference between the target manifold charge air temperature and the under-hood air temperature decreases.

In this way, a local cooling percentage or request and an external cooling percentage or request may be determined based on a target manifold charge air temperature and additional engine air and coolant temperatures. The local cooling percentage and the external cooling percentage may then be used to adjust an engine coolant pump, CAC fan, engine cooling fan, and/or vehicle grille shutters to deliver the determined cooling percentages. The cooling percentages may be further adjusted based on ambient air temperature and additional vehicle operating conditions. For example, the grille shutters and engine cooling fan adjustments may also be based on increasing vehicle fuel economy and engine efficiency. By adjusting the cooling elements in this way, the charge air entering the engine may be controlled near a target temperature, thereby decreasing condensate formation and engine knock, while also increasing engine efficiency.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
   determining a first difference between a target manifold charge air temperature and a temperature of a charge air cooler (CAC) cooling medium and a second difference between a CAC inlet charge air temperature and the target manifold charge air temperature;
   adjusting one or more of a grille shutter position and a speed of an engine cooling fan based on the determined first difference between the target manifold charge air temperature and the temperature of the CAC cooling medium; and
   adjusting a local CAC cooling element including one of a CAC fan and coolant pump based on the determined second difference between the CAC inlet charge air temperature and the target manifold charge air temperature.

2. The method of claim 1, further comprising adjusting both the grille shutter position and the speed of the engine cooling fan based on the first difference between the target manifold charge air temperature and the temperature of the CAC cooling medium, wherein the engine cooling fan is different than the CAC fan, and wherein the grille shutter position is a position of grille shutters positioned at a vehicle front end, forward of the engine cooling fan, a radiator, and a CAC to which the local CAC cooling element is coupled to.

3. The method of claim 2, wherein the CAC to which the local CAC cooling element is coupled to is a water-to-air CAC, the CAC cooling medium is a coolant, and adjusting the local CAC cooling element includes adjusting a coolant pump speed of the CAC coolant pump.

4. The method of claim 3, wherein adjusting the coolant pump speed is further based on a mass air flow rate of charge air flowing from a compressor and through the CAC, a difference between a target coolant temperature and a CAC inlet coolant temperature, and a difference between a measured manifold charge air temperature and the target manifold charge air temperature, and wherein the target coolant temperature is based on the target manifold charge air temperature with the target coolant temperature decreasing for decreasing target manifold charge air temperature.

5. The method of claim 1, wherein adjusting one or more of the grille shutter position and the speed of the engine cooling fan and adjusting the local CAC cooling element includes adjusting one or more of the grille shutter position and the speed of the engine cooling fan at the same time as adjusting the local CAC cooling element and wherein the engine cooling fan is different than the CAC fan.

6. The method of claim 3, wherein adjusting one or more of the grille shutter position and the speed of the engine cooling fan is further based on an ambient temperature.

7. The method of claim 1, wherein a CAC to which the local CAC cooling element is coupled to is an air-to-air CAC, the CAC cooling medium is under-hood air, and adjusting the local CAC cooling element includes adjusting the CAC fan, different than the engine cooling fan, wherein the engine cooling fan is coupled to a radiator.

8. The method of claim 7, wherein adjusting the CAC fan is further based on a mass air flow rate of charge air flowing in an intake passage from a compressor and through the CAC, a difference between the target manifold charge air temperature and a temperature of the ambient air, and a difference between a measured manifold charge air temperature and the target manifold charge air temperature.

9. The method of claim 1, wherein the grille shutter position is a position of grille shutters positioned at a vehicle front end, forward of the engine cooling fan, a radiator, and a CAC to which the local CAC cooling element is coupled, wherein adjusting one or more of the grille shutter position and the speed of the engine cooling fan is further based on vehicle speed, engine temperatures, and outside weather conditions, and wherein the target manifold charge air temperature is a desired temperature based on knock and CAC condensate formation and the CAC inlet charge air temperature and temperature of the CAC cooling medium are measured temperatures.

10. An engine method, comprising:
setting a target manifold charge air temperature based on condensate formation and combustion stability;
determining a difference between a charge air cooler inlet air temperature and the set target manifold charge air temperature;
determining a difference between the set target manifold charge air temperature and a temperature of a charge air cooler cooling medium, where the temperature of the charge air cooler cooling medium is one of an under-hood air temperature and a charge air cooler inlet coolant temperature;
adjusting one of a coolant pump speed of a charge air cooler coolant pump or a charge air cooler fan speed of a charge air cooler fan based on a local cooling percentage, the local cooling percentage determined based on the determined difference between the charge air cooler inlet air temperature and the set target manifold charge air temperature and a cooling capacity of a charge air cooler; and
adjusting a grille shutter position by a first amount and an engine cooling fan speed of an engine cooling fan by a second amount, the first and second amounts based on an external cooling percentage and vehicle operating conditions, the external cooling percentage determined based on the determined difference between the set target manifold charge air temperature and the temperature of the charge air cooler cooling medium.

11. The method of claim 10, wherein the local cooling percentage is further determined based on a mass air flow of charge air flowing from a compressor and through the charge air cooler and a determined difference between a measured manifold charge air temperature and the set target manifold charge air temperature and wherein the determined local cooling percentage increases with increasing mass air flow and increasing difference between the measured manifold charge air temperature and the set target manifold charge air temperature.

12. The method of claim 10, wherein the external cooling percentage is further determined based on ambient temperature, the external cooling percentage decreasing with increasing ambient temperature.

13. The method of claim 10, wherein the charge air cooler is a water-to-air charge air cooler and the cooling capacity is based on a difference between a target coolant temperature and the charge air cooler inlet coolant temperature.

14. The method of claim 12, further comprising determining the coolant pump speed based on the determined local cooling percentage and wherein the coolant pump speed increases for increasing local cooling percentage.

15. The method of claim 12, wherein the temperature of the charge air cooler cooling medium is the charge air cooler inlet coolant temperature and wherein the determined external cooling percentage increases as the difference between the set target manifold charge air temperature and the charge air cooler inlet coolant temperature decreases.

16. The method of claim 10, wherein the charge air cooler is an air-to-air charge air cooler and the cooling capacity is based on a difference between the set target manifold charge air temperature and ambient temperature and wherein the charge air cooler fan is different than the engine cooling fan.

17. The method of claim 16, further comprising determining the charge air cooler fan speed based on the determined local cooling percentage and wherein the charge air cooler fan speed increases for increasing local cooling percentage.

18. The method of claim 16, wherein the temperature of the charge air cooler cooling medium is under-hood air temperature and wherein the external cooling percentage decreases as a difference between the target manifold charge air temperature and the under-hood air temperature decreases.

19. The method of claim 10, further comprising determining the first amount and the second amount based on one or more of a vehicle speed, engine temperatures, and outside weather conditions, and wherein adjusting the grille shutter position by the first amount includes adjusting a position of grille shutters positioned at a vehicle front end, forward of a radiator, the charge air cooler, and the engine cooling fan.

20. An engine system, comprising:
an engine including an intake manifold;
a compressor coupled to the intake manifold upstream of a throttle;
a water-to-air charge air cooler coupled downstream of the compressor;
a coolant pump coupled to a water side of the charge air cooler;
an engine cooling fan coupled to a radiator;
grille shutters positioned at a vehicle front end, forward of the engine cooling fan, water-to-air charge air cooler, and radiator; and
a controller with computer readable instructions for:
determining each of a difference between a target manifold charge air temperature and a charge air cooler inlet coolant temperature, a difference between a charge air cooler inlet air temperature and the target manifold charge air temperature, a difference between a target coolant temperature and the charge air cooler inlet coolant temperature, and a difference between a measured manifold charge air temperature and the target manifold charge air temperature;
adjusting one or more of an opening of the grille shutters and a speed of the engine cooling fan based on the determined difference between the target manifold charge air temperature and the charge air cooler inlet coolant temperature; and
adjusting a speed of the coolant pump based on the determined difference between the charge air cooler inlet air temperature and the target manifold charge air temperature, the determined difference between the target coolant temperature and the charge air cooler inlet coolant temperature, a mass air flow of charge air flowing from the compressor and through the water-to-air charge air cooler, and the determined difference between the measured manifold charge air temperature and the target manifold charge air temperature.

* * * * *